United States Patent [19]

Shigemoto

[11] Patent Number: 4,988,558
[45] Date of Patent: Jan. 29, 1991

[54] LAMINATED FILM

[75] Inventor: Hiromi Shigemoto, Iwakuni, Japan

[73] Assignee: Mitsui Petrochemical Industries, Ltd., Tokyo, Japan

[21] Appl. No.: 357,254

[22] Filed: May 26, 1989

[30] Foreign Application Priority Data

Jun. 1, 1988 [JP] Japan ................ 63-135267

[51] Int. Cl.$^5$ .............................. B32B 7/02
[52] U.S. Cl. .................... 428/213; 428/516; 525/240
[58] Field of Search ................ 428/516, 213; 525/240

[56]  References Cited

U.S. PATENT DOCUMENTS 4,210,686  7/1980  Gajweski et al. ................ 428/35
4,837,277  6/1989  Shigemoto ..................... 525/146

FOREIGN PATENT DOCUMENTS 29540  2/1986  Japan .

*Primary Examiner*—Edith Buffalow
*Attorney, Agent, or Firm*—Sherman and Shalloway

[57] ABSTRACT

A laminated film comprising
(A) a layer of a polymer of 4-methyl-1-pentene,
(B) an interlayer of a mixture of (a) a polymer of 4-methyl-1-pentene and (b) an alpha-olefin copolymer comprising 10 to 85 mole % of propylene units, 3 to 60 mole % of 1-butene units and 10 to 85 mole % of units of an alphaolefin having at least 5 carbon atoms, the proportions being based on the total amount of the propylene units, the 1-butene units and the other alpha-olefin units, having a crystallinity, determined by X-ray diffractometry, of not more than 20%, and
(C) a layer of a polyolefin derived from an alpha-olefin having 2 to 4 carbon atoms, as a main component, the layers (A), (B) and (C) being laminated in the order stated.

10 Claims, No Drawings

LAMINATED FILM

This invention relates to a laminated film. More specifically, it relates to a laminated film having excellent heat sealability and containing a poly(4-methyl-1-pentene) substrate.

Poly(4-methyl-1-pentene), by taking advantage of its transparency, thermal resistance and chemical resistance, is used as a coating agent on chemical experimental instruments such as beakers and measuring cylinders, syringes, photometric cells, trays for use in electronic ovens, and paper coating materials for cartons. The problem with poly(4-methyl-1-pentene) is that its heat sealing property is poor although it has a high melting point and good thermal stability.

For improving the heat sealability of poly(4-methyl-1-pentene), it is the most general method to bond a resin having a lower melting point than poly(4-methyl-1-pentene) and excellent heat-sealability, such as polyethylene or polypropylene, to poly(4-methyl-1-pentene). However, polyethylene or polypropylene has poor adhesiveness to poly(4-methyl-1-pentene), and mere co-extrusion lamination of both does not result in a practical laminated structure.

For example, Japanese Laid-Open Patent Publication No. 145844/1985 proposes a laminated structure composed of an interlayer of a propylene/alpha-olefin random copolymer having a propylene content of 50 to 87 mole % and a crystal fusion heat, measured by thermal analysis by a scanning differential calorimeter, of 10 to 80 joules/g, a layer of poly(4-methyl-1-pentene) on one side of the interlayer and a layer of polyethylene or polypropylene on the other.

Japanese Laid-Open Patent Publication No. 295450/1986 discloses a laminated structure composed of an interlayer of polymer composition consisting of 95 to 40% by weight of a propylene/alpha-olefin random copolymer having a propylene content of 50 to 87 mole % and a crystal fusion heat, determined by thermal analysis by a scanning differential calorimeter, of 10 to 80 joules/g and 5 to 60% by weight of poly(4-methyl-1-pentene), a layer of poly(4-methyl-1-pentene) on one side of the interlayer, and a layer of a polyolefin derived from an alpha-olefin having 2 to 4 carbon atoms as a main component on the other.

None of these patent documents describe a terpolymer as the propylene/alpha-olefin random copolymer.

It is an object of this invention to provide a laminated structure of poly(4-methyl-1-pentene) and as an interlayer, a novel adhesive layer.

Another object of this invention is to provide a laminated film having excellent transparency, surface gloss, water repellency, thermal resistance, chemical resistance, interlayer adhesion, heat sealability and thermal shrinkage in a well-balanced combination.

Other objects of the invention along with its advantages will become apparent from the following descriptions.

According to this invention, these objects and advantages are achieved by a laminated film comprising (A) a layer of a polymer of 4-methyl-1-pentene, (B) an interlayer of a polymer of (a) a polymer of 4-methyl-1-pentene and (b) an alpha-olefin copolymer comprising 10 to 85 mole % of propylene units, 3 to 60 mole % of 1-butene units and 10 to 85 mole % of units of an alpha-olefin having at least 5 carbon atoms, the proportions being based on the total amount of the propylene units, the 1-butene units and the other alpha-olefin units, having a crystallinity, determined by X-ray diffractometry, of not more than 20%, and (C) a layer of a polyolefin derived from an alpha-olefin having 2 to 4 carbon atoms, as a main component, the layers (A), (B) and (C) being laminated in the order stated.

The laminated film of the invention will now be described specifically.

The polymer of 4-methyl-1-pentene may be a homopolymer of 4-methyl-1-pentene or a copolymer of 4-methyl-1-pentene and another alpha-olefin. Examples of the other alpha-olefin are alpha-olefins having 2 to 20 carbon atoms such as ethylene, propylene, 1-butene, 1-hexene, 1-octene, 1-decene, 1-tetradecene and 1-octadecene.

The copolymer is preferably composed of at least 85 mole % of 4-methyl-1-pentene and a minor proportion of the other alpha-olefin.

The polymer of 4-methyl-1-pentene has a melt flow rate ($MFR_5$; load: 5 kg; temperature: 260° C.) of preferably 0.5 to 200 g/10 minutes. If its melt flow rate is less than 0.5 g/10 minutes, the polymer has too high a melt viscosity and tends to have reduced moldability. If it exceeds 200 g/10 minutes, the melt viscosity of the polymer is too low, and the polymer tends to have reduced moldability and lowered mechanical strength. Such a polymer of 4-methyl-1-pentene is well known and available under PPX ® from Mitsui Petrochemical Industries, Ltd.

The interlayer (B) of the laminated film of this invention is comprised of a mixture of (a) the polymer of 4-methyl-1-pentene and (b) the alpha-olefin copolymer.

The 4-methyl-1-pentene polymer (a) may be a homopolymer of 4-methyl-1-pentene or a copolymer of it with another alpha-olefin. Preferred copolymers are as exemplified above with regard to the polymer of layer (A).

The alpha-olefin copolymer (b) is a copolymer of propylene, 1-butene and an alpha-olefin having at least 5 carbon atoms.

Illustrative of the alpha-olefin having at least 5 carbon atoms are 1-pentene, 3-methyl-1-butene, 1-hexene, 4-methyl-1-pentene, 3-methyl-1-pentene, 1-heptene, 1-octene, 1-decene and 1-dodecene. Of these, alpha-olefins having 6 to 12 carbon atoms are preferred.

The alpha-olefin copolymer (b) contains 10 to 85 mole % of propylene units, 3 to 60 mole % of 1-butene units and 10 to 85 mole % of units of the alpha-olefin having at least 5 carbon atoms, the proportions being based on the total weight of these units. The content of the propylene units is preferably 15 to 70 mole %, especially 25 to 55 mole %. The content of the 1-butene units is preferably 5 to 50 mole %, especially 10 to 40 mole %. The content of the other alpha-olefin units is preferably 15 to 70 mole %, especially 20 to 60 mole %.

The alpha-olefin copolymer (b) has a crystallinity, determined by X-ray diffractometry, of not more than 20%, preferably not more than 15%, more preferably not more than 10%.

The use of alpha-olefin copolymers having a propylene content of less than 10 mole % or above 85 mole %, a 1-butene content of less than 3 mole % or above 60 mole %, or a content of the alpha-olefin having at least 5 carbon atoms of less than 10 mole % or above 85 mole % fails to give laminated films having excellent interlayer adhesion as contemplated by the invention. The same can be said with regard to the use of an alpha-olefin copolymer (b) having a crystallinity of over 20%.

The crystallinity of the alpha-olefin copolymer (b) by X-ray diffractometry is determined by the following procedure. The sample is compression-molded at 280° C. under 30 kg/cm$^2$ for 10 minutes, and then cooled for 5 minutes by a water-cooled press (pressure: 30 kg/cm$^2$) kept at 23° C. to prepare a test piece having a size of 2 cm×4 cm×1 mm. The test specimen is subjected to a rotating cathode X-ray diffraction device (RU-300, made by Rigaku Denki Kabushiki Kaisha), and the X-ray diffraction curve at a diffraction angle ($2\theta$) of 5° to 31° is measured. A base line is drawn between a diffraction angle ($2\theta$) of 6° and 30° to divide the area into an amorphous portion and a crystalline portion. The weight percent of the crystalline portion is determined, and defined as the crystallinity.

Usually, the alpha-olefin copolymer (b) has an intrinsic viscosity [$\eta$], measured at 135° C. in decalin, of 0.6 to 6 dl/g, preferably 0.5 to 5 dl/g, more preferably 1.0 to 4 dl/g. If the intrinisic viscosity is less than 0.6 dl/g or above 6 dl/g, the polymer may have degraded moldability.

Preferably, the alpha-olefin copolymer (b) contains not more than 5.0 % by weight, preferably not more than 4.0 % by weight, of a boiling n-heptane-insoluble portion, and not more than 5.0% by weight, preferably not more than 2.5% by weight, of an acetone-soluble portion at 25° C. If the proportion of the boiling n-heptane-insoluble portion exceeds 5% by weight, the transparency of the alpha-olefin copolymer may have reduced transparency or the composition composed of this alpha-olefin copolymer and the 4-methyl-1-pentene polymer, when molded into a film, may cause the occurrence of fish eyes. If the content of the acetone-soluble portion exceeds 5.0% by weight, the interlayer composed of the alpha-olefin copolymer and the 4-methyl-1-pentene polymer has surface tackiness, and is likely to have reduced adhesion to the 4-methyl-1-pentene layer (A).

The contents of the boiling n-heptane-insoluble portion and the acetone-soluble portion at 25° C. of the alpha-olefin copolymer are measured by the following methods.

Boiling n-heptane-insoluble portion

A small sample having a size of about 1 mm×1 mm×1 mm together with glass beads is put in a cylindrical glass filter, and extracted with boiling n-heptane for 14 hours by a Soxhlet extractor. The weight percent of the insoluble portion is determined by weighing the dissolved portion or the insoluble portion.

Acetone-soluble portion at 25° C.

A smaple (15 g) is dissolved in 250 ml of n-decane at 130° C., and the solution is put in 500 ml of acetone to precipitate an acetone-insoluble portion of the polymer. By filtration, the acetone-insoluble portion is removed, and then 300 m of water is added to the filtrate. The mixture is separated by a separation funnel into an n-decane layer and a water-acetone layer. By concentrating the n-decane layer, the content of the acetone-soluble portion is determined.

The alpha-olefin copolymer (b) having the above characteristics used in this invention may be produced, for example, by copolymerizing propylene, 1-butene and the alpha-olefin having at least 5 carbon atoms by using a catalyst composed of (A) a solid titanium catalyst component obtained by treating (a) a highly active solid titanium catalyst component consisting essentially of a magnesium compound, a titanium compound and an electron donor with (b) a halogenated hydrocarbon, (B) an organoaluminum compound, and (C) an electron donor component comprising a silicon compound. The methods of preparing this catalyst are described, for example, in Japanese Laid-Open Patent Publications Nos. 811/1981 and 83006/1983.

The 4-methyl-1-pentene polymer (a) constituting the interlayer (B) of the laminated film of the invention may be the same as the 4-methyl-1-pentene polymer constituting the layer (A). It should be undrstood however that the 4-methyl-1-pentene polymer used in layer (A) may be different from that used in the interlayer (B). The proportion of the alpha-olefin copolymer (b) based on the total weight of the 4-methyl-1-pentene polymer (a) and the alpha-olefin copolymer (b) is preferably 80 to 30% by weight, more preferably 70 to 40% by weight. Accordingly, the proportion of 4-methyl-1-pentene polymer is preferably 20 to 80% by weight, and more preferably 30 to 60% by weight.

If the mixing proportions are outside the specified range, the resulting laminated film tends to have reduced interlayer adhesion, increase thermal shrinkage and reduced thermal resistance.

The polyolefin of layer (C) constituting the laminated film of this invention is a polyolefin derived from an alpha-olefin having 2 to 4 carbon atoms as a main component (preferably at least 5 mole %), that is, a crystalline polymer derived from ethylene, propylene or 1-butene as a main component. Examples of this polyolefin are polyethylene, polypropylene and poly-1-butene. So long as its main component is derived from an alpha-olefin having 2 to 4 carbon atoms, the polyolefin may be a homopolymer or a copolymer. The copolymer may be, for example, a copolymer of an alpha-olefin having 2 to 4 carbon atoms and another copolymerizable monomer, for example, an alpha-olefin having 2 to 20 carbon atoms, a vinyl compound such as vinyl acetate, vinyl chloride, acrylic acid, methacrylic acid or styrene, or a grafted copolymer thereof obtained by grafting the above copolymer with an unsaturated carboxylic acid such as maleic anhydride, maleic acid or acrylic acid, or a derivative thereof. A mixture of these polymers may also be used as the polyolefin of layer (C).

Specific examples of the polyethylene used as layer (C) include high-pressure low-density polyethylene (LDPE), ethylene/propylene copolymer, ethylene/1-butene copolymer, ethylene/4-methyl-1-pentene copolymer, ethylene/1-hexene copolymer, high-density polyethylene (HDPE), ethylene/vinyl acetate copolymer, and ethylene/acrylic acid copolymer. Of these, LDPE, ethylene/alpha-olefin copolymers and ethylene/vinyl acetate copolymer are preferred because of their transparency and low-temperature heat-sealability. Preferably, the LDPE, ethylene/alpha-olefin copolymers, ethylene/vinyl acetate copolymer have a density of 0.910 to 0.960 g/cm$^3$ and a melting point (Tm: ASTM D-3418) of 100° to 135° C.

From the viewpoint of moldability, the polyethylene has a melt flow rate (MFR$_3$: ASTM D-1238, E) of preferably 0.01 to 50 g/10 minutes, more preferably 0.1 to 10 g/10 minutes.

Specific examples of the polypropylene used as layer (C) include polypropylene (propylene homopolymer), propylene random copolymers (with a propylene content of usually at least 90 mole %, preferably at least 95 mole %), and propylene/ethylene block copolymer with an ethylene content of usually 5 to 30 mole %) such as propylene/ethylene random copolymer and propylene/ethylene/1-butene random copolymer. Of these, polypropylene and the propylene random copolymers are preferred because of their excellent transparency. The random copolymers having a melting point (Tm: ASTM D-3481) of 130° to 140° C. are particularly preferred because of their excellent heat-sealability. From the standpoint of moldability, the $MFR_2$ of the polypropylene is preferably 0.5 to 30 g/10 minutes, more preferably 0.3 to 10 g/10 minutes.

Specific examples of the poly-1-butene used as layer (C) include 1-butene homopolymer, 1-butene/ethylene copolymer, 1-butene-propylene copolymer and 1-butene/4-methyl-1-pentene copolymer.

The laminated film of this invention may be produced by known methods. They include, for example, a method comprising forming a 4-methyl-1-pentene polymer film, and extrusion-coating a composition for formation of an interlayer composed of the 4-methyl-1-pentene polymer (a) and the alpha-olefin copolymer (b) and the polyolefin onto the 4-methyl-1-pentene polymer film; a method comprising extrusion-laminating a 4-methyl-1-pentene polymer film and a polyolefin film, which are separately prepared, by using a composition for formation of an interlayer composed of the 4-methyl-1-pentene (a) and the alpha-olefin copolymer (b); and a method comprising co-extruding the 4-methyl-1-pentene polymer, the interlayer composition composed of the 4-methyl-1-pentene polymer (a) and the alpha-olefin copolymer (b), and the polyolefin by using a multilayer die system having at least three dies with the interlayer composition being extruded as an interlayer. Of these, the co-extrusion molding method is preferred because its operation is simple and it can give laminated films having better interlayer adhesion. The co-extrusion holding method may be carried out by using a flat die (T-die method) or a circular die (inflation method). The flat die may be of a single manifold type using a black box or a multi-manifold type. Known dies may be used in the inflation method.

The interlayer composition may be prepared by blending the 4-methyl-1-pentene (a) and the alpha-olefin copolymer (b) by using a Henschel mixer, a V-type blender or the like, or a single-screw or a multi-screw extruder.

In the laminated film of this invention, there is no particular limitation on the thicknesses of the individual layers. For example, the thickness of the 4-methyl-1-pentene polymer layer (A) is 800 to 2 micrometers, preferably 100 to 5 micrometers; the thickness of the interlayer (B) composed of the 4-methy-1-pentene polymer (b) and the alpha-olefin copolymer (b) is 600 to 2 micrometers, preferably 50 to 5 micrometers; and the thickness of the polyolefin layer (C) is 800 to 2 micrometers, preferably 100 to 5 micrometers.

The laminated film of this invention results from lamination of the layer (A), (B) and (C) in this order. Hence, it may be a three-layer film in which the layers (A), (B) and (C) are laminated in this order, or a five-layer film in which the layers (C), (B), (A), (B) and (C) are laminated in this order.

In order to impart gas-barrier property, a polyvinylidene resin, polyvinyl alcohol, a saponified ethylene vinyl acetate copolymer, a polyamide, a polyester, paper, an aluminum foil, or the like may further be laminated to the above laminated structure.

Furthermore, ordinary additives to polyolefins, such as a weatherability stabilizer, a heat stabilizer, an antistatic agent, an antihaze agent, an antiblocking agent, a slip agent, a lubricant, a pigment, a dye or a nucleating agent may be incorporated in any one of these layers or all these layers in amounts which do not impair the objects of this invention.

To improve heat-sealability, an ethylene/alpha-olefin copolymer such as ethylene/propylene copolymer and ethylene/1-butene copolymer, or an ethylene/vinyl acetate copolymer, which is low crystalline or amorphous, may be added to the polyolefin layer (C).

The laminated film of this invention has excellent transparency, surface gloss, water repellency, thermal resistance, chemical resistance, interlayer adhesion and heat sealability and low thermal shrinkage.

By taking advantage of the aforesaid properties, the laminated film of this invention can be favorably used as a packing material for various foodstuffs such as vegetables, confectionary, meat, bread and marine products, or as chemical experimental instruments such as beakers and measuring cylinders, syringes, photometric cells, trays for electronic ovens and paper coating materials for cartons.

The following examples illustrate the present invention in more detail. It should be understood taht the invention is in no way limited to these examples.

EXAMPLE 1

(1) The following two copolymers were prepared.

(A) 4-Methyl-1-pentene/1-decene copolymer (4MP-1 for short) having a density of 0.835 g/cm$^3$ and an $MFR_5$ of 26 g/10 min.

(B) Propylene/1-butene/4-methyl-1-pentene copolymer (PBM for short) having a propylene content of 36 mole %, a butene content of 14 mole %, a 4-methyl-1-pentene content of 50 mole %, a glass transition point (Tg) of 5° C., a density (D) of 0.860 g/cm$^3$, an MFR of 0.88 g/10 min. and a crystallinity, determined by X-ray diffractometry, of 1.2%.

4MP-1 (70% by weight) and PBM (30% by weight) were blended, and 0.5% by weight of Irganox 1010 was added. The mixture was granulated by a twin-screw extruder (screw diameter 45 mm; cylinder temperature 270° C.) and used for formation of an interlayer.

(2) Propylene/ethylene random copolymer (PP for short) having a density of 0.91 g/cm$^3$, an MFR of 5 g/10 min. and a Tm of 140° C. was melted in an extruder (screw diameter 40 mm; cylinder temperature 250° C.); 4MP-1 was melted in an extruder (screw diameter 40 mm; cylinder temperature 270° C.); and 4MP-1/PBM 70/30 by by weight granules were melted in an extruder (screw diameter 40 mm; cylinder temperature 260° C.). These molten masses were extruded from a coat hanger die (die temperature 260° C.) of a three-layer T-die film forming machine, and cooled to give a co-extruded three-layer film composed of 20 micrometers of an inside layer of PP, 20 micrometers of an interlayer layer of 4MP-1/PBM (=70/30) and 20 micrometers of an outside layer of 4MP-1. The properties of the film were evaluated by the following methods, and the results obtained are shown in Table 1.

Tensile strength

Measured in accordance with ASTM D-638. The dumbell shape was type W, and the pulling speed is adjusted to 200 mm/min.

Thermal shrinkage (%)

Indicator lines, 100 mm×100 mm, were marked in the sample film. After leaving the samples to stand for 30 minutes in an oven kept at 140° to 220° C., and the distance between the indicator lines was actually measured. The percent shrinkage was calculated from (distance before shrinkage—distance after shrinkage/distance before shrinkage.

Heat seal strength (g/15 mm)

The sample film was folded over, and heat-sealed with a seal bar of 5 mm in width at a temperature of 140°, 160° and 180° C. under a pressure of 2 kg/cm$^2$, followed by gradual cooling. A test piece, 15 mm in width, was cut off from this sample, and subjected to a T-peel test at a peeling speed of 300 mm/min.

Delamination strength (g/15 mm)

A test piece 15 mm in width, was cut out, and the individual layers were peeled at a crosshead speed of 300 mm/min., and the peel strength was determined.

EXAMPLE 2

Example 1 was repeated except that the ratio of PBM to 4MP-1 in Example 1 was changed as shown in Table 1. The results are shown in Table 1.

COMPARATIVE EXAMPLE 1

Example 1 was repeated except that PBN alone was used as the interlayer. The results are shown in Table 1.

We claim:

1. A laminated film comprising
   (A) a layer of a polymer of 4-methyl-1-pentene,
   (B) an interlayer of a mixture of (a) a polymer of 4-methyl-1-pentene and (b) an alpha-olefin copolymer comprising 10 to 85 mole % of propylene units, 3 to 60 mole % of 1-butene units and 10 to 85 mole % of units of an alpha-olefin having at least 5 carbon atoms, the proportions being based on the total amount of the propylene units, the 1-butene units and the other alpha-olefin units, having a crystallinity, determined by X-ray diffractometry, of not more than 20%, and
   (C) a layer of a polyolefin derived from an alpha-olefin having 2 to 4 carbon atoms, as a main component, the layers (A), (B) and (C) being laminated in the order stated.

2. The laminated film of claim 1 in which the 4-methyl-1-pentene polymer constituting the layer (A) and the 4-methyl-1-pentene polymer used in the interlayer (B) are identical or different and are a homopolymer of 4-methyl-1-pentene, or a copolymer of 4-methyl-1-pentene and an alpha-olefin having 2 to 20 carbon atoms.

3. The laminated film of claim 1 in which the alpha-olefin copolymer (b) used in the interlayer (B) is a copolymer of propylene, 1-butene and an alpha-olefin having 6 to 12 carbon atoms.

4. The laminated film of claim 1 in which the alpha-olefin copolymer (b) is composed of 15 to 70 mole % of propylene units, 5 to 50 mole % of 1-butene units and 15 to 70 mole % of units of an alpha-olefin having at least 5 carbon atoms.

5. The laminated film of claim 1 in which the alpha-olefin copolymer (b) has a crystallinity of not more than 15%.

6. The laminated film of claim 1 in which the alpha-olefin copolymer (b) contains no more than 5.0% by weight of a boiling n-heptane-insoluble portion, and not

| | | Comparative Example | Example 1 | Example 2 | Remarks |
|---|---|---|---|---|---|
| Structure | Outside layer | 4MP-1 | 4MP-1 | 4MP-1 | T-die method |
| | Interlayer | PBM/4MP-1 = 100/0 | PBM/4MP-1 = 70/30 | PBM/4MP-1 = 50/50 | Black box |
| | Inside layer | PP | PP | PP | The interlayer was melt-blended by a twin-screw extruder. |
| Thickness (μm) | Outside/inter/inside | 20/20/20 | 20/20/20 | 20/20/20 | |
| Tensile strength | Stress at yield (kg/cm$^2$) | 154/155 | 120/110 | 160/130 | Test speed: 200 mm/min. Test piece shape: Type W |
| | Stress at breakage (kg/cm$^2$) | 220/200 | 210/190 | 260/240 | |
| | Young's modulus (kg/cm$^2$) | 7500/7300 | 5600/4600 | 6800/5000 | |
| | Elongation at break (%) | 160/270 | 240/290 | 230/230 | |
| Thermal shrinkage (%) MD/TD | 140° C., 30 min. | −2.24/0.76 | −0.42/0.77 | −0.71/0.84 | Air oven |
| | 160° C., 30 min. | −2.66/1.55 | −0.97/1.22 | −0.99/0.87 | −: elongation |
| | 180° C., 30 min. | −3.40/1.60 | −1.45/2.34 | −1.21/0.87 | +: shrinkage |
| | 200° C., 30 min. | −3.52/2.61 | −1.29/1.77 | −1.15/1.02 | |
| | 220° C., 30 min. | −3.39/3.54 | −0.34/2.10 | −0.70/1.73 | |
| Heat seal strength (g/15 mm) | 140° C. | 1030 interfacial peeling | 280 interfacial peeling | 860 interfacial peeling | Heat sealing conditions Pressure = 2 kg/cm$^2$ |
| | 160° C. | 1620 substrate broken | 2060 substrate broken | 2180 substrate broken | Time = 1 second Test speed: 300 mm/min. |
| | 180° C. | 1600 substrate broken | | 2370 substrate broken | |
| Delamination strength (g/15 mm) | YPX/adhesive layer | 600 | peeling impossible | peeling impossible | T-peel method Test speed: 300 mm/min. |
| | adhesive layer/PP | peeling impossible | peeling impossible | peeling impossible | | more than 5.0% by weight of an acetone-soluble portion at 25° C.

7. The laminated film of claim 1 in which the interlayer (B) consists of 20 to 80% by weight of the 4-methyl-1-pentene polymer (a) and 80 to 20% by weight of the alpha-olefin copolymer (b) and based on the total weight of the polymer (a) and the copolymer (b).

8. The laminated film of claim 1 in which the polyolefin constituting the layer (C) is a homopolymer of an alpha-olefin having 2 to 4 carbon atoms, or a copolymer of said alpha-olefin with another copolymerizable monomer.

9. The laminated film of claim 8 in which the polyolefin is polyethylene, polypropylene or poly(1-butene).

10. The laminated film of claim 1 in which the thickness of the layer (A) is 800 to 2 micrometers, the thickness of the interlayer (B) is 600 to 2 micrometers, and the thickness of the layer (C) is 800 to 2 micrometers.

* * * * *